(12) United States Patent
Antinori et al.

(10) Patent No.: US 12,530,245 B2
(45) Date of Patent: Jan. 20, 2026

(54) CONTAINER IMAGE TOOLING STORAGE MIGRATION

(71) Applicant: Red Hat, Inc., Raleigh, NC (US)

(72) Inventors: Paolo Antinori, Milan (IT); Rishab Prasad, Bangalore (IN); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 578 days.

(21) Appl. No.: 17/953,886

(22) Filed: Sep. 27, 2022

(65) Prior Publication Data

US 2024/0103933 A1    Mar. 28, 2024

(51) Int. Cl.
*G06F 9/06* (2006.01)
*G06F 8/61* (2018.01)
*G06F 9/50* (2006.01)

(52) U.S. Cl.
CPC .............. *G06F 9/5088* (2013.01); *G06F 8/63* (2013.01); *G06F 9/5077* (2013.01)

(58) Field of Classification Search
CPC ........ G06F 9/5088; G06F 8/63; G06F 9/5077; G06F 9/541; G06F 2009/45562; G06F 9/45558
See application file for complete search history.

(56) References Cited

U.S. PATENT DOCUMENTS

| | | | |
|---|---|---|---|
| 9,852,137 B2 | 12/2017 | Mann et al. | |
| 10,013,213 B2 | 7/2018 | Suresh et al. | |
| 10,389,598 B2 | 8/2019 | Padala et al. | |
| 10,664,186 B2 | 5/2020 | Makin et al. | |
| 10,922,123 B2 | 2/2021 | Smith et al. | |
| 11,119,976 B2 * | 9/2021 | Lemke | G06F 16/119 |
| 2020/0327371 A1 | 10/2020 | Sharma et al. | |
| 2021/0089495 A1 * | 3/2021 | Lemke | G06F 16/183 |
| 2022/0050705 A1 * | 2/2022 | Shen | G06F 9/4868 |
| 2022/0197689 A1 * | 6/2022 | Hotinger | G06F 9/45558 |
| 2023/0031354 A1 * | 2/2023 | Tahenakos | G06F 9/45558 |

FOREIGN PATENT DOCUMENTS

CN          112286640 A     11/2020

OTHER PUBLICATIONS

Ma et al.; Efficient Live Migration of Edge Services Leveraging Container Layered Storage; IEEE Transactions on Mobile Computing; Sep. 24, 2018; pp. 2020-2033; vol. 18; No. 9.
Author unknown; Container Migration Methodology; Amazon Web Services, Inc.; Nov. 2020; 24 Pgs.

* cited by examiner

*Primary Examiner* — Kevin L Young
*Assistant Examiner* — Abdou K Seye
(74) *Attorney, Agent, or Firm* — Kilpatrick Townsend & Stockton LLP

(57) ABSTRACT

Container image tooling storage migration is generally described. In some examples, a first pull operation for a first container image may be performed. The first container image may be generated using a first container management tool. In various cases, a first binary representation of the first container image may be read. The first binary representation may be associated with the first container management tool. In some examples, a second binary representation of the first container image that corresponds to a second container management tool may be received. In various cases, a first container may be executed by the second container management tool using the second binary representation.

16 Claims, 6 Drawing Sheets

CONTAINER IMAGE TOOLING STORAGE MIGRATION

BACKGROUND

Trusted execution environments (TEEs), such as virtual machines and/or containers may be used to emulate all or a portion of a computer system. The trusted execution environments allow running various software modules, for example, multiple operating systems, concurrently and in isolation from other software modules, on one or more interconnected physical computer systems. Additionally, trusted execution environments may, for example, allow for consolidating multiple physical servers into one physical server running multiple guest virtual machines in order to improve the hardware utilization rate.

A cluster of trusted execution environments may offer distributed computing services in a cloud-based architecture to a variety of clients. Many such clusters offer a distributed data grid that pools together the random access memory of clustered devices/TEEs to allow applications to share data with other applications running in the cluster.

SUMMARY

The present disclosure provides new and innovative systems and methods for container image tooling storage migration. In an example, a method includes performing a first pull operation for a first container image. The first container image was may be generated using a first container management tool. The method may include reading a first binary representation of the first container image. In some examples, the first binary representation may be associated with the first container management tool. The method may include receiving a second binary representation of the first container image that corresponds to a second container management tool. In various examples, the method may include executing a first container by the second container management tool using the second binary representation.

In some examples, a system for container image tooling storage migration may include at least one processor and non-transitory computer-readable memory. The non-transitory computer-readable memory may store instructions that, when executed by the at least one processor, are effective to perform a first pull operation for a first container image, wherein the first container image was generated using a first container management tool. The non-transitory computer-readable memory may store further instructions that, when executed by the at least one processor, are effective to read a first binary representation of the first container image, the first binary representation being associated with the first container management tool. The non-transitory computer-readable memory may store further instructions that, when executed by the at least one processor, are effective to receive a second binary representation of the first container image that corresponds to a second container management tool. The non-transitory computer-readable memory may store further instructions that, when executed by the at least one processor, are effective to execute a first container by the second container management tool using the second binary representation.

In some examples, a non-transitory machine-readable medium may store a program which, when executed by a processor, may be effective to perform a method that includes performing a first pull operation for a first container image, wherein the first container image was generated using a first container management tool. The method may further include reading a first binary representation of the first container image, the first binary representation being associated with the first container management tool. The method may further include receiving a second binary representation of the first container image that corresponds to a second container management tool. The method may further include executing a first container by the second container management tool using the second binary representation.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
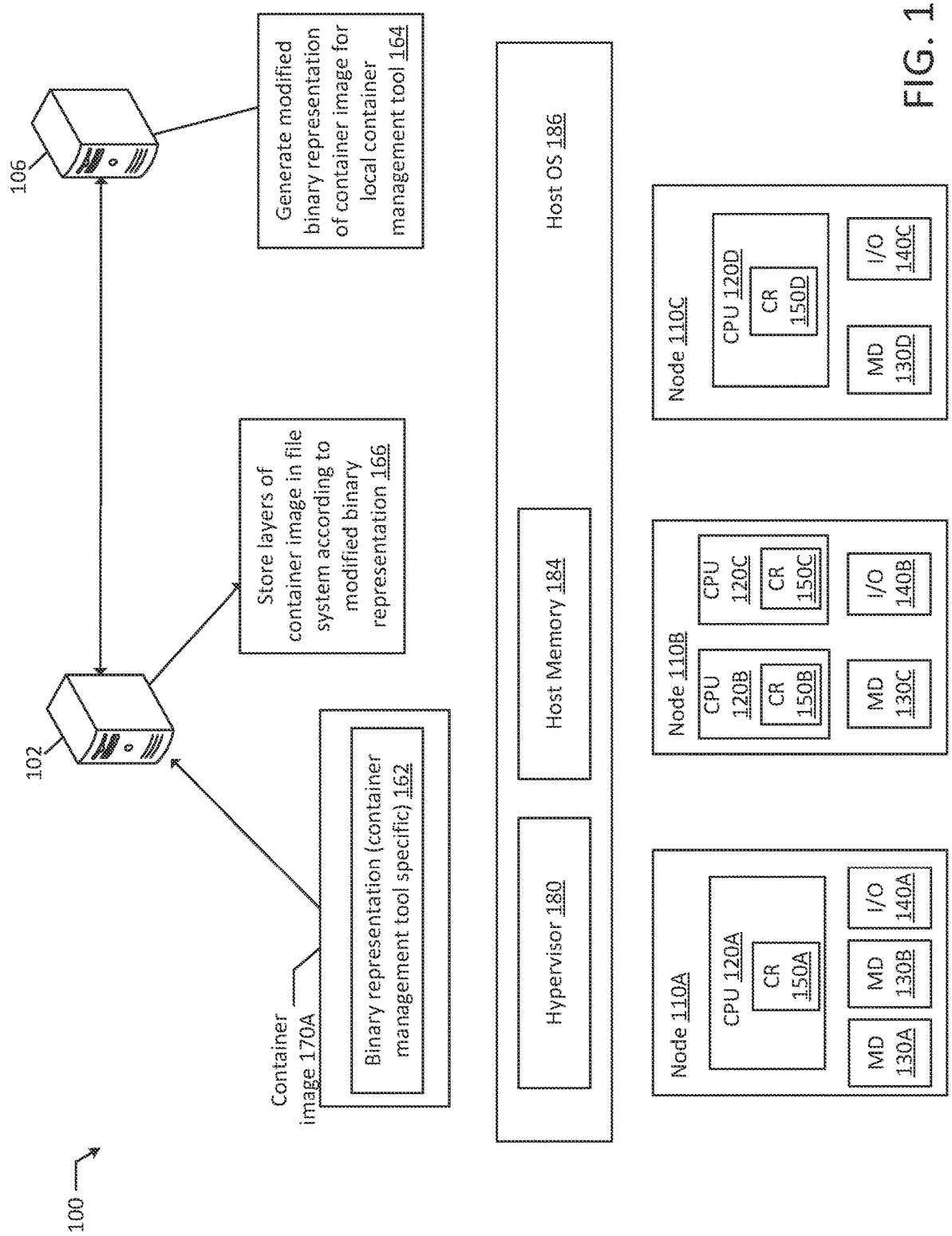
FIG. 1 is a block diagram of container image tooling migration, according to various examples of the present disclosure.

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, container-based virtualization systems may be employed. For example, a "cluster" of such resources that is managed by a container manager (sometimes referred to as a "container orchestration service") such as Red Hat OpenShift executing a containerization runtime environment such as Docker, Podman, Linux LXD, Singularity, etc. (referred to herein as container management tools) may be advantageous, as container based virtualization systems may be lighter weight than systems using virtual machines with hypervisors.

In the case of containers, a container will often be hosted on a physical host or virtual machine that already has an operating system executing, and the container may be hosted on the operating system of the physical host or VM. In large scale implementations, container schedulers, such as those included in container orchestrators (e.g., Red Hat OpenShift, Kubernetes, Docker Swarm), generally respond to frequent container startups and cleanups with low latency. Containers may enable wide spread, parallel deployment of computing power for specific tasks. In a typical example, a container may be instantiated to process a specific task and may be reaped (e.g., un-instantiated) after the task is complete.

Container images are immutable files that include the source code, libraries, dependencies, tools, and/or other files used by an application or service to run. Due to the read-only quality of container images, container images represent an application or service at a specific point in time (e.g., for a particular version) allowing developers to test and experiment on software in stable, uniform conditions. A container, once created using a container image, adds a writable layer on top of the immutable container image, enabling modification. When a containerized environment is executed, a read-write copy of the container image file system is created inside the container. The container is a virtualized runtime environment where applications/services are isolated from the underlying system. Different container management tools (e.g., Docker, Podman, etc.) may be used to execute a container using a container image.

Container images are often uploaded to cloud-based storage repositories where users may pull down container images to execute containers on local host machines. The containers are executed via the container management tools (such as Podman, Docker, etc.) using the pulled-down container images. Some container images are designed according to a standard so that such containers can be downloaded onto a disk of a local host machine and unpacked (e.g., from a compressed form such as a tarball) to be executed by container a runtime. The Open Container Initiative (OCI) is one such standard. Accordingly, OCI-compliant container images can be unpacked and used to execute a container in the same way across different container management tools.

However, container images that are pulled down and/or unpacked using a first container management tool may not be compatible with use by another container management tool. This may occur because the binary representation of the container image may differ when pulling down/unpacking the container image using different container management tools. Additionally, different container management tools may store the layers of container images in different locations in the local file system. Accordingly, the same container image may not be able to be used locally by multiple different container management tools. For example, pulling down a container image using Docker will store the layers of the container image in a specific set of locations within the local file system. Podman may be unable to execute a container using this image since Podman expects the layers of the container image to be stored in a different location in the local file system. This problem persists even when the container image is OCI-compliant. Accordingly, a developer and/or engineer may be required to pull down different container images using different container management tools and may be required to maintain multiple different container management tools on their local system.

Accordingly, described herein are systems and techniques that use a remote service to monitor the container management tools executing on a local computing device using a daemon executing on the local computing device. When a local device pulls down a container image, the remote service is configured to determine the native binary representation of the container image and may generate modified binary representations for each of the container management tools executed by the local computing device. The remote service may send the modified binary representations to the local computing device. Accordingly, the local computing device may use the desired container management tool to run a container based on the pulled down container image.

For example, a user may pull down a Docker container image, unpacking the binary from the Docker container image may result in storing the container image layers at specific locations in the local file system that are associated and predetermined for Docker container images. The daemon may send data identifying the user computing device, the provenance of the container image (e.g., data specifying that the container image is a Docker container image), and data identifying the container management tools installed on the user device to the remote service. The remote service may generate modified binary for the other container management tools installed on the user's device. In some examples, this may include instructions on where in the local file system to store the layers of the container image. In other examples, this may include storing pointers to the locations in the file system at which the Docker container image layers were stored. The pointers may be stored at locations corresponding to another container management tool that is installed on the user's device. The process is performed automatically using communication between the daemon and the remote service without requiring specific user instructions to be provided to the remote service. Advantageously, a user employing the service may reduce the number of container management tools installed on the user's local machine as any container image may be compatible with any container management tool once the container image is modified by the remote service. In an example with two container management tools (e.g., Docker and Podman), the cardinality of tools is n=2. Adding existing or newly-developed tools and supporting inter-tool compatibility would require each container management tool to require support for conversion to each other type of tool in order to be compatible and up to date (leading to an exponential cardinality of tooling support (i.e., $2^n$)). This would require a large compute footprint and would limit the deployability and scalability of such a solution within resource-constrained environments. The various techniques described herein offload the translation of container management tool binary representations between different tools to a remote service that is able to convert the local (e.g., native) container image storage from one container management tool to the others with only n+1 cardinality of container management tooling storage support. This may be helpful in a variety to offload compute complexity from local devices to backend devices and may be particular beneficial for Internet-of-Things devices as such devices tend to have limited compute resources.

FIG. 1 depicts a high-level component diagram of an example computing system 100 in accordance with one or more aspects of the present disclosure. The computing system 100 may include an operating system (e.g., host OS 186), one or more compute nodes (e.g., nodes 110A-C), local computing device 102, and a remote computing device 106. In various examples, the various nodes 110A-C, local computing device 102, and/or remote computing device 106 may be configured in communication over a network (e.g., a local area network (LAN) or a wide area network (WAN) such as the Internet).

Any of the nodes 110A-C and/or the computing device 102 may comprise one or more virtualized compute instances (e.g., trusted execution environments (TEEs)). Such TEE instances may be a virtual machine, container, enclave, etc. The TEE instance may include a guest OS, guest memory, a virtual CPU (VCPU), virtual memory devices (VMD), and virtual input/output devices (VI/O).

The computing system 100 may also include a supervisor or hypervisor 180 and host memory 184. The supervisor or hypervisor 180 may manage host memory 184 for the host operating system 186 as well as memory allocated to the TEEs and/or guest operating systems. Host memory 184 and/or any guest memory may be divided into a plurality of memory pages that are managed by the supervisor or hypervisor 180.

Guest memory allocated to a guest OS may be mapped from host memory 184 such that when an application uses or accesses a memory page of guest memory, the guest application is actually using or accessing host memory 184.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). As shown in FIG. 1, CPU 120A-D may include one or more control registers (such as CR 150A-D). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Similarly, computing device 102 and/or remote device 106 may include a network device, input/output devices, storage, memory, at least one processor, etc. TEE instances may be provisioned on the same host or node (e.g., node 110A) or different nodes (e.g., on computing device 102).

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

In various examples, computing device 102 may execute various container management tools to execute containerization runtime environments. In some cases, the computing device 102 may pull down a container image 170A. The container image 170A may have a binary representation 162 that is container management tool specific (i.e., the container image 170A may be a Docker container image and may have a binary representation that is specific to Docker container images). The binary representation may include instructions on where to store the various layers of the container image 170A in the local file system of computing device 102 when the container image 170A is unpacked (e.g., from a compressed file). Remote computing device 106 may communicate with computing device 102 over a network. In various examples, a daemon executing on computing device 102 may provide data identifying the computing device 102 from among other devices and may provide data indicating the container management tools that are installed on computing device 102. In further examples, the daemon may provide data that identifies any container images (such as container image 170A) pulled down by the computing device 102 and/or by container management tools executing on computing device 102.

When the remote computing device 106 determines that computing device 102 has pulled down a container image (e.g., container image 170A), the remote computing device may determine the type of container image and/or the container management tool used to create the container image. The remote computing device 106, at action 164, may determine each other container management tool installed on the computing device 102 and may generate respective modified binary representations of the container image for each of the other container management tools using the binary representation 162 of the pulled-down container image (e.g., container image 170A). The modified binary representations may be sent to the computing device 102 and the computing device 102 may store layers of the container image in the local file system according to the modified binary representation(s) (action 166). In various examples, this may include storing layers in a way that is specific to the other container management tools in the local file system of computing device 102. In some other cases, the modified binary representation may include instructions effective to cause computing device 102 to store pointer data at the locations in the file system where the other container management tools expect the container image layers to be stored. The pointer data may point to the locations in the local file system where the layers of the binary representation 162 are stored. In some cases, remote computing device 106 may include code that is generated specifically for translation between two different container management tools. However, in other cases, the remote computing device 106 may use existing compatibilities to generate the modified binary representation. In some cases, the container images may be built using different standards. Accordingly, the remote computing device 106 may generate the modified binary representations such that the container image may be used with any desired container management tool.

In some examples, remote computing device 106 may be configured to read and interpret the downloaded binaries and metadata corresponding to a specific source program (e.g., container image created using a specific container management tool) and create the corresponding ones for the target container management tool. In some other examples, the remote computing device 106 may use existing compatibility. For example, the remote computing device 106 may generate symbolic links (e.g., pointers) to the original files, assuming file system support, to make the container image compatible for different container management tools. In some examples, the remote computing device may add additional optimization from a disk consumption point of view with the modified binary representations.

For example, the remote computing device 106 may determine each container management tool running on the computing device 102 and may translate/symbolically link the data between the native container management tool of the binary representation 162 and each other container management tool running on computing device 102. Advantageously, using a daemon executing on computing device 102 to monitor for new container images and/or new container management tools may enable use of the remote computing device 106's translation services only when needed. The service provided by remote computing device 106 is not based on externalized configuration.

In some examples, import/export support may exist between container management tools A and B, and, independently, between container management tools A and C (e.g., through APIs of the individual container management tools). The remote computing device 106 may calculate the chain of invocations, the corresponding ordering, and flags used to provide the transitive behavior that would allow a container image configured for container management tool B to be converted to the binary representation for a container image configured for container management tool C.

In some further examples, the remote computing device 106 may store various data schemas (e.g., the file structure of the different container management tools) and may implement behavior that would manipulate a format of a container image for a specific container management tool into a container image specific to another container management tool. In such cases, the remote computing device 106 may operate directly on files while skipping the original container management tool APIs. Although remote computing device 106 is mentioned as a single device, it should be noted that remote computing device 106 may be multiple computing devices that may each perform a portion of the operations described herein as being performed by remote computing device 106.

Figure 2:
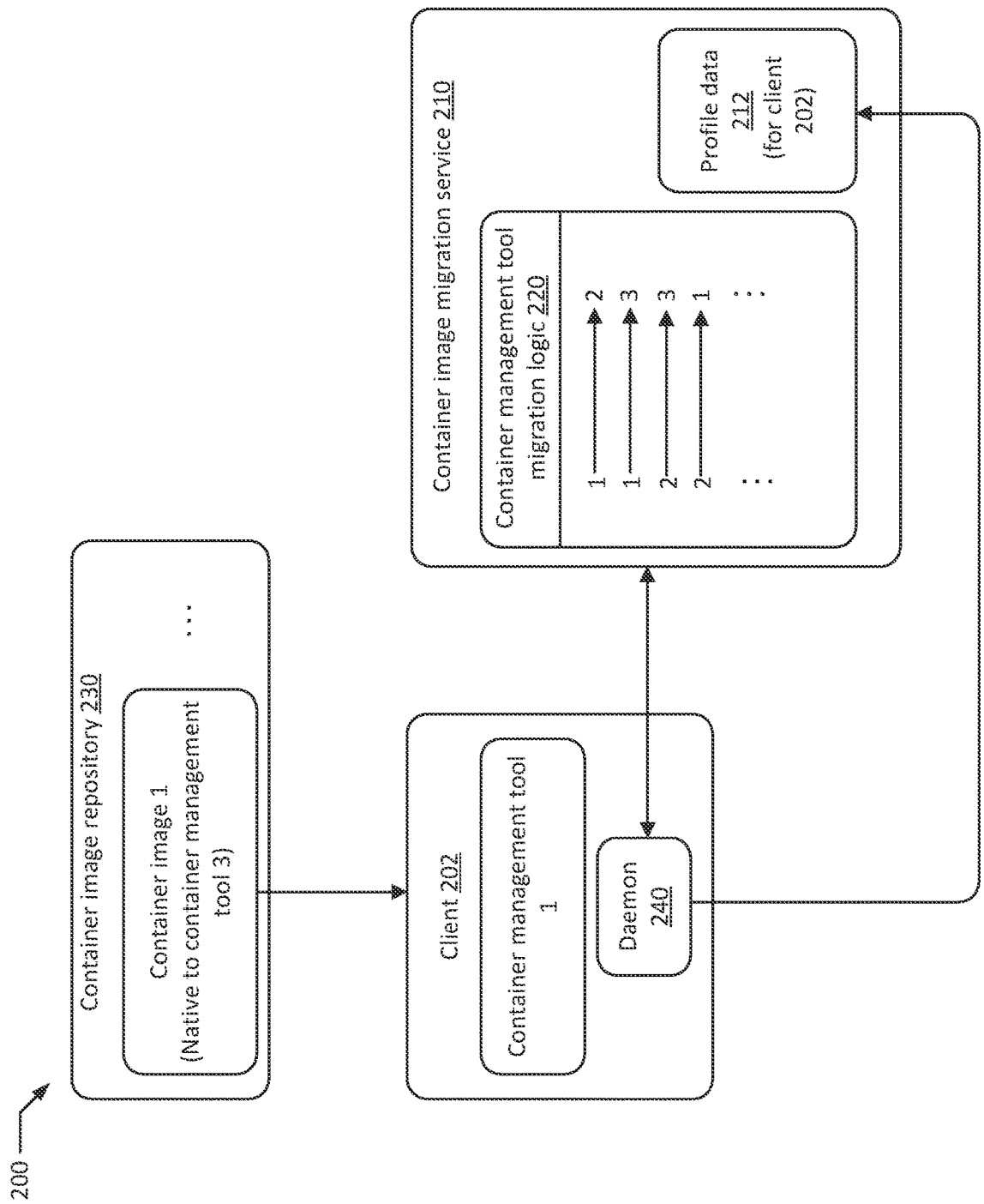
FIG. 2 is a block diagram illustrating operations performed by remote service to provide container image tooling migration, according to various examples of the present disclosure.

FIG. 2 is a block diagram 200 illustrating operations performed by remote service to provide container image tooling migration, according to various examples of the present disclosure. In various examples, a client 202 may be a computing device that may execute a container management tool (e.g., container management tool 1). The client 202 may execute a daemon 240 or other process that may run continuously on the operating system of the client 202. The daemon 240 or other process may communicate with the container image migration service 210 (an example of a service that may be executed by remote computing device 106 of FIG. 1).

Container image migration service 210 may receive profile data 212 which may be data specific to client 202 and may indicate the different container management tools installed and/or executing on client 202. The profile data 212 may be updated in real time by the daemon 240 or other process executing at client 202 to reflect the current container management tools executed by client 202. Additionally, container image migration service 210 may store container management tool migration logic 220. The container management tool migration logic 220 may be effective to modify binary representations of container images such that the container images generated using one container management tool may be compatible with another container management tool. Various examples of such logic are described above in reference to FIG. 1.

Client 202 may pull down a container image 1 from a remote container image repository 230. The container image 1 may be native to container management tool 3. The daemon 240 or other process executing on the client 202 may send the binary representation of the container image 1 to the container image migration service 210 along with data identifying the client 202 from among other nodes. The container image migration service 210 may use data identifying the client 202 to lookup the container management tools executing on the client 202 in the profile data 212. In the example of FIG. 2, the client 202 is executing container management tool 1. Accordingly, the container image migration service 210 may use container management tool migration logic 220 to modify the binary representation of the container image 1 from being configured for container management tool 3 to being configured for container management tool 1. The container image migration service 210 may send the modified binary representation to the client 202 (e.g., via the daemon 240). Client 202 may thereafter execute a container using container management tool 1 and the modified binary representation of container image 1 since the modified binary representation of container image 1 is compatible with container management tool 1. Modification may include storing the layers of container image 1 in the appropriate locations in client 202's file system that are used by the container management tool 1.

Figure 3:
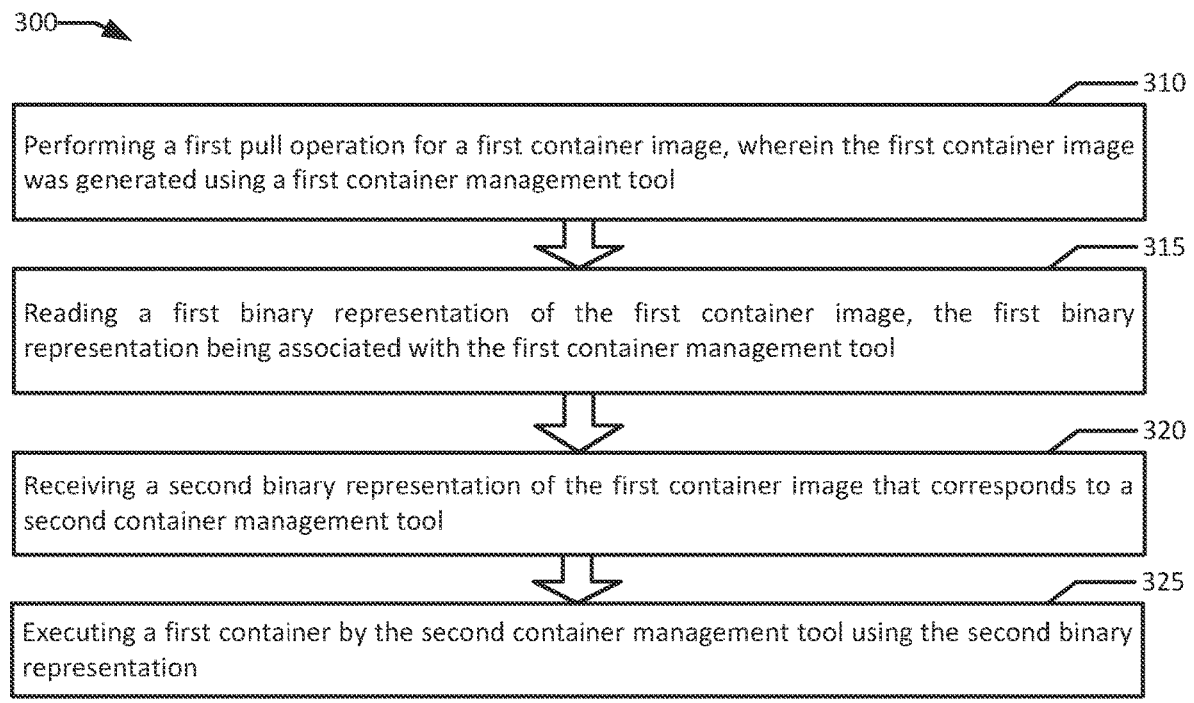
FIG. 3 is flowchart illustrating an example process for container image tooling migration, according to an example of the present disclosure.

FIG. 3 is flowchart illustrating an example process 300 for container image tooling migration, according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes performing a first pull operation for a first container image (block 310). A pull operation may refer to downloading and/or unpacking a container image from a remote repository storing one or more container images. The first container image may be generated and therefore configured for a first container management tool. For example, the first container image may be a Docker image.

The example process 300 may include reading a first binary representation of the first container image (block 315). The first binary representation may be associated with the first container management tool. In various examples, the first binary representation may specify a first set of locations in the local file system at which layers of the first container image should be stored for compatibility with the first container management tool.

The example process 300 may include receiving a second binary representation of the first container image that corresponds to a second container management tool (block 320). For example, a daemon may send data identifying the compute node that has pulled down the first container image to a remote service. Additionally, the daemon may send the first binary representation of the first container image to the remote service. The remote service may determine, via the daemon, other container management tools executed by the relevant compute node and may generate the second binary representation of the first container image by modifying the first binary representation to be compatible with at least one of the other container management tools being executed by the compute node. The remote service may send the second binary representation to the compute node via the daemon (or otherwise).

The example process 300 may include executing a first container by the second container management tool using the second binary representation (block 325). Upon receipt of the second binary representation that is configured for execution by the second container management tool, the local compute node may execute a container using the second binary representation of the first container image.

In some other aspects, a method may include receiving first data indicating that a first container image was generated using a first container management tool; receiving a first binary representation of the first container image from the first computing device, the first binary representation being associated with the first container management tool; determining that the first computing device has a second container management tool installed; generating a second binary representation of the first container image that corresponds to the second container management tool; and sending the second binary representation of the first container image to the first computing device.

Figure 4A:
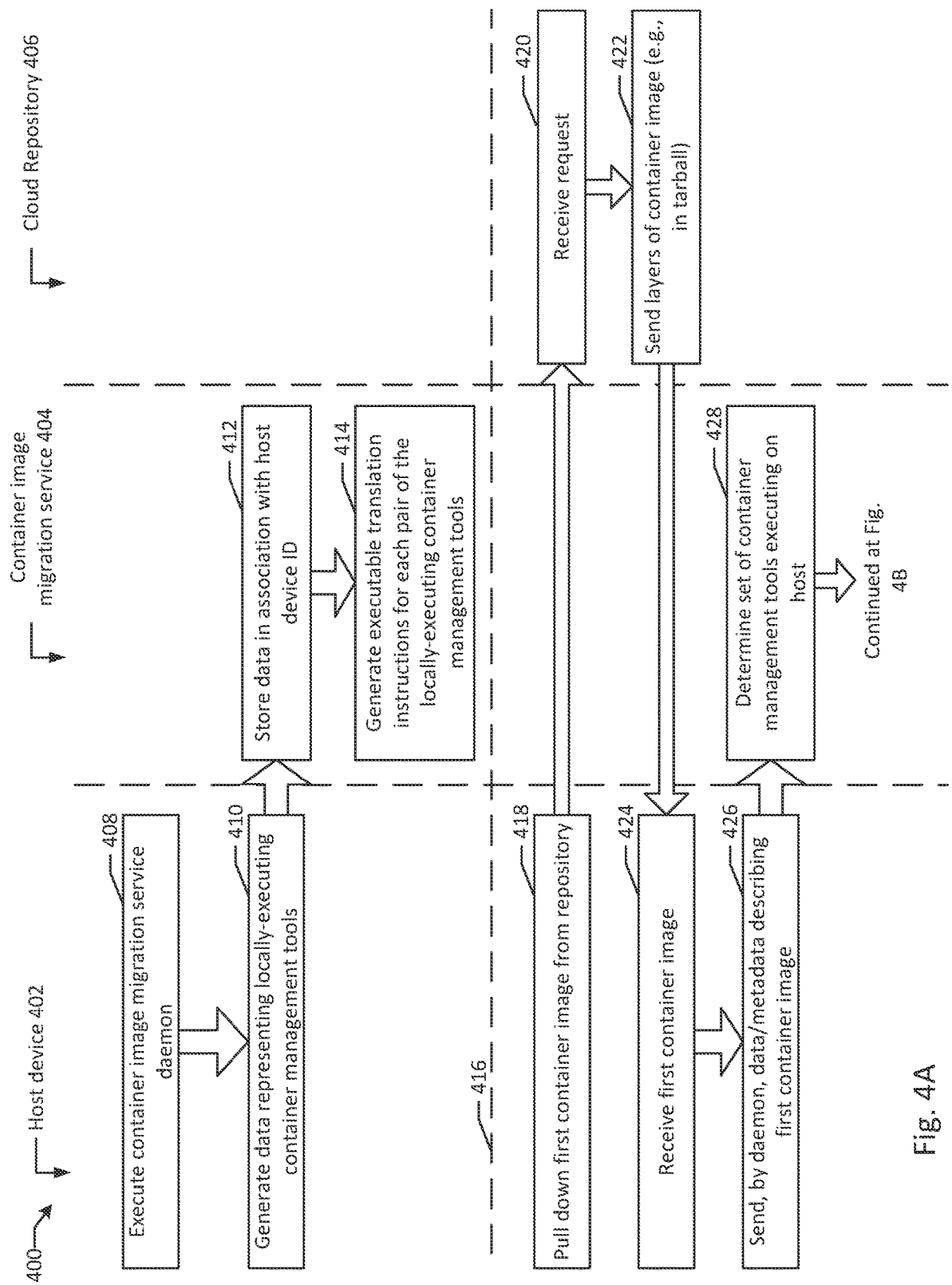
FIGS. 4A, 4B illustrate a flow diagram of an example of providing container image compatibility across multiple container management tools, in accordance with various aspects of the present disclosure.
Figure 4B:
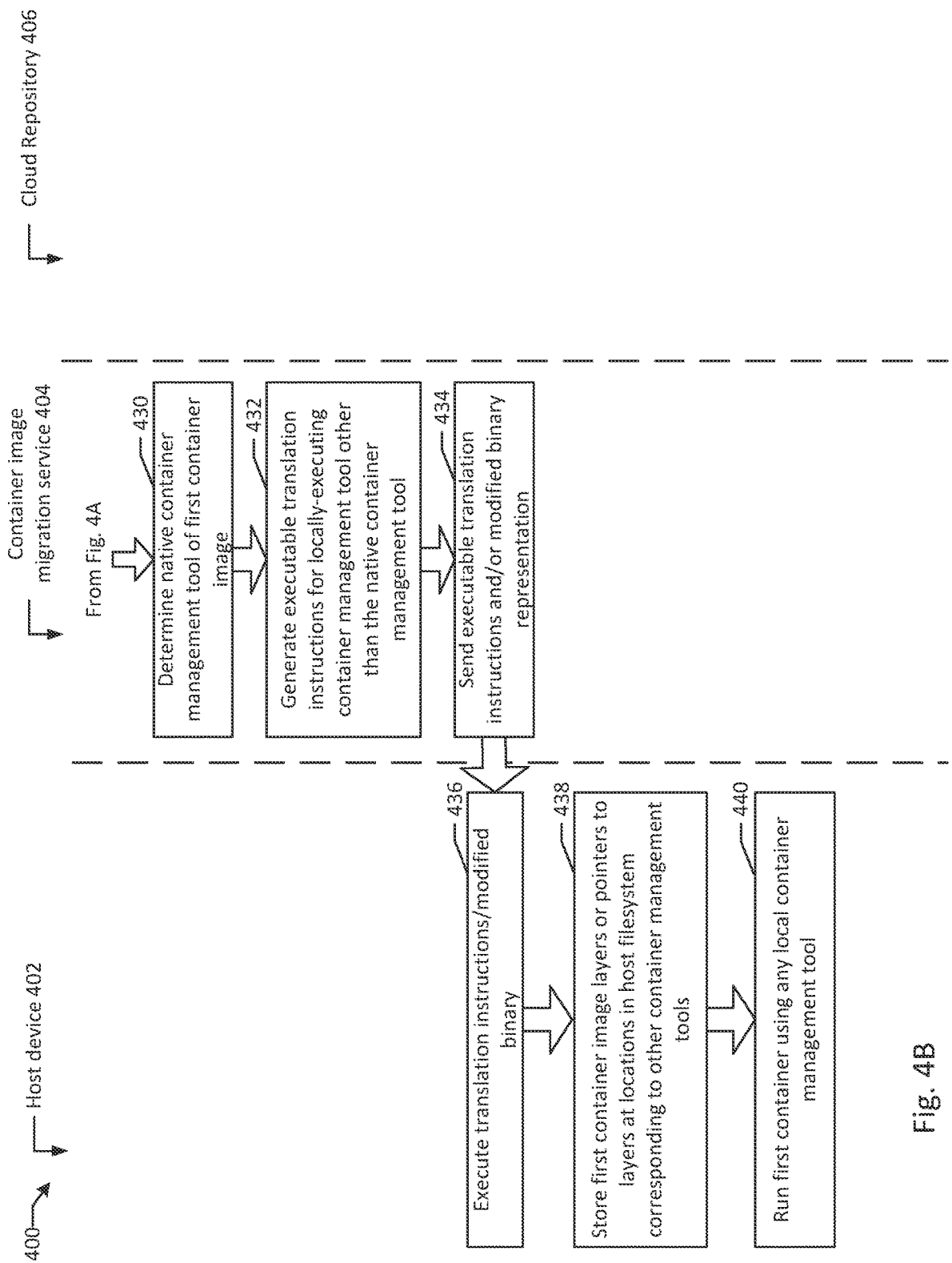

FIGS. 4A, 4B illustrate a flow diagram 400 of an example of providing container image compatibility across multiple container management tools, in accordance with various aspects of the present disclosure. Although the examples below are described with reference to the flow diagram illustrated in FIGS. 4A and 4B, it will be appreciated that many other methods of performing the acts associated with FIGS. 4A and 4B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

A host device 402 may execute a container image migration service daemon (block 408). The container image migration service daemon may be configured in network communication with the container image migration service 404, which may be executed remotely (e.g., at a data center) with respect to the host device 402. The host device 402 may generate data representing locally-executing container management tools (block 410). For example, the daemon may scan the host device 402 to determine the container management tools that are either currently installed or are currently executing. The data may be sent by the daemon to the container image migration service 404. The container image migration service 404 may store the data in association with the host device ID (block 412). For example, the container image migration service 404 may store the data as part of the profile data 212 depicted in FIG. 2.

In some examples, the container image migration service 404 may generate executable translation instructions for each pair of the locally-executing (or locally installed) container management tools (block 414). For example, a first set of translation instructions for a first pair of container management tools may be used to modify a container image created using a first container management tool to be compatible with a second container management tool. A second set of translation instructions for the first pair of container management tool may be used to modify a container image created using the second container management tool to be compatible with the first container management tool. This same process may be performed for each pair of container management tools executing or installed on the host device 402. Dashed line 416 may represent the passage of some amount of time.

The host device 402 may pull down a first container image from cloud repository 406 (block 418). The cloud repository 406 may receive the request (block 420) and may send the layers of the requested container image to the host device (e.g., in a compressed form such as a tarball) (block 422). The host device 402 may receive the first container image (block 424). The daemon may send data/metadata describing the first container image to the container image migration service 404 (block 426). The container image migration service 404 may determine the set of container management tools executing on the host device 402 (block 428). For example, the data/metadata sent by the daemon may indicate the currently executing/installed container management tools for the host device 402. Processing may continue at FIG. 4B.

The container image migration service 404 may determine the native container management tool of the first container image (block 430). For example, the container image migration service 404 may determine the container management tool that was used to generate the first container image (e.g., by evaluating the binary representation and/or the schema of the first container image). The container image migration service 404 may generate executable translation instructions for locally-executing container management tools other than the native container management tool (block 432). For example, the container image migration service 404 may generate instructions to generate a modified binary representation of the first container image that is configured for one or more of the other container management tools executing and/or installed on the host device 402. The modified binary representation may include instructions to store the layers of the first container image in the correct locations in the file system for the relevant container management tools.

The container image migration service 404 may send executable translation instructions and/or modified binary representation of the first container image to the host device 402 (block 434). The host device 402 may receive and execute the translation instructions and/or the modified binary representation (block 436). Accordingly, when the first container image is unpacked using the relevant container management tool, the host device 402 may store the first container image layers or pointers to the layers at locations in the host file system that correspond to the relevant container management tools (and/or any other executing/installed container management tools) (block 438). The host device 402 may thereafter execute a first container using any local container management tool (block 440).

Figure 5:
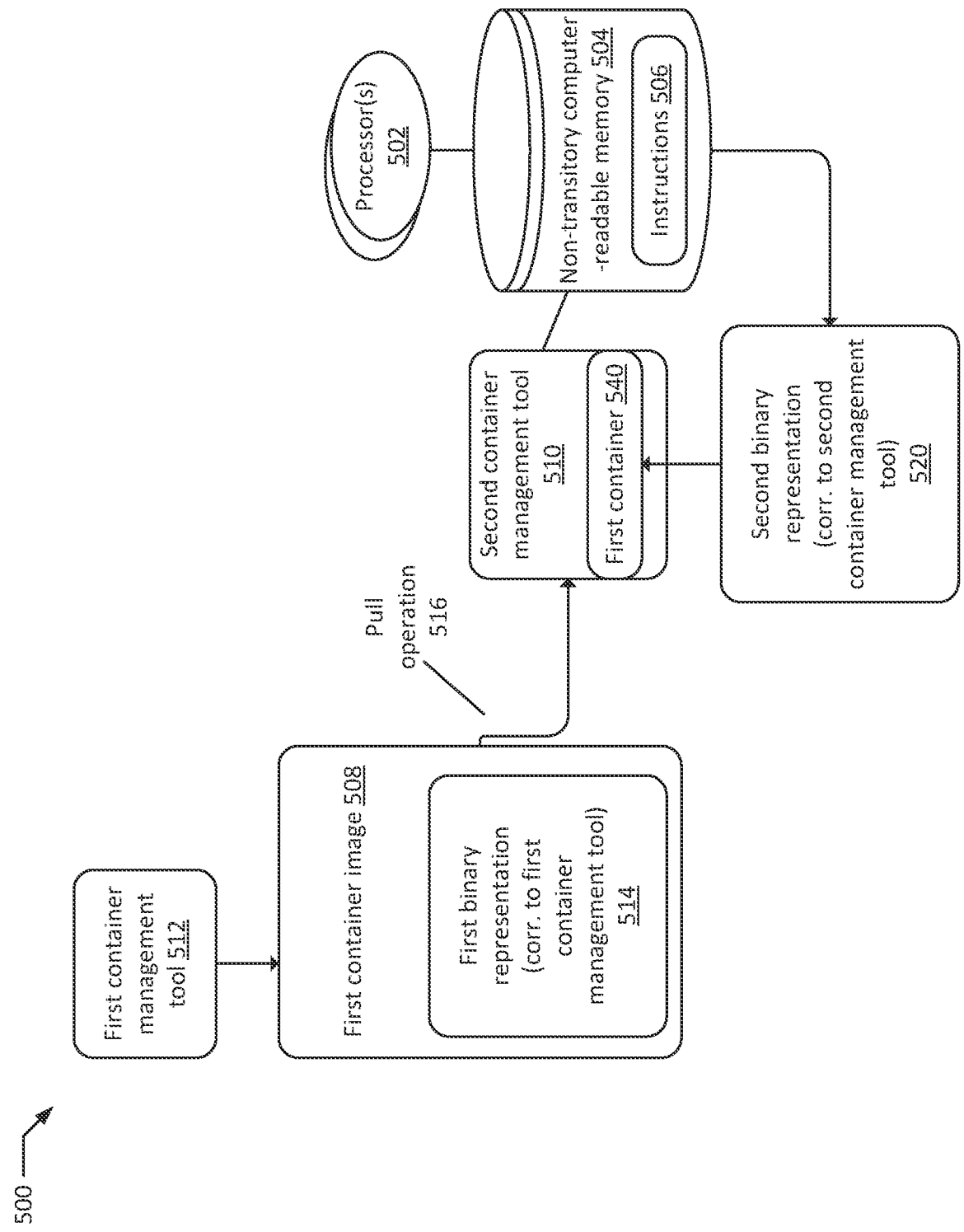
FIG. 5 is block diagram of system effective to implement container image tooling migration, according to an example of the present disclosure.

FIG. 5 is block diagram 500 that includes one or more processors 502 configured in communication with non-transitory computer-readable memory 504. The non-transitory computer-readable memory 504 may store instructions 506 that cause one or more of the actions described herein to be performed. In various examples, a computing device (e.g., host device 402) may perform a pull operation 516 for a first container image 508. The first container image 508 may have been generated using a first container management tool 512. In some examples, a first binary representation 514 of the first container image 508 may be read. The first binary representation 514 may be associated with the first container management tool 512.

In some examples, the computing device (e.g., host device 402) may receive a second binary representation of the first container image 520. The second binary representation of the first container image 520 may correspond to a second container management tool (e.g., second container management tool 510, which may be executed by the host device 402). After receiving the second binary representation of the first container image 520 (which may be the modified version of the first binary representation received from a container image migration service 404), the host device may execute a first container 540 by the second container management tool (e.g., Docker, Podman, etc.) using the second binary representation 520.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
  performing, by a first computing device, a first pull operation for a first container image, wherein the first container image was generated using a first container management tool that is incompatible with the first computing device;
  sending, by a daemon executing on the first computing device, first data indicating the first container image to at least one remote computing device configured to read a first binary representation of the first container image, the first binary representation being associated with the first container management tool;
  receiving, by the daemon and from the at least one remote computing device, a second binary representation of the first container image that corresponds to a second container management tool associated with the first computing device, the first binary representation being translated into the second binary representation;
  receiving, by the daemon and from the at least one remote computing device, second data including instructions effective to cause the first computing device to store the second binary representation in a file location associated with the second container management tool; and
  executing, by the first computing device, a first container by the second container management tool using the second binary representation.

2. The method of claim 1, wherein the at least one remote computing device is configured to:
  generate the second binary representation;
  send the second binary representation of the first container image to the first computing device; and
  send the instructions to the first computing device to store a first layer of the first container image in a first location in a local file system of the first computing device, wherein the first location is associated with the second container management tool.

3. The method of claim 1, further comprising:
  determining a first number of layers of the first container image; and
  storing the first number of layers of the first container image at a first location in a file repository that is associated with the first container management tool, wherein the second binary representation comprises instructions to store pointer data at a second location in the file repository that is associated with the second container management tool.

4. The method of claim 3, wherein the pointer data points to the first location in the file repository.

5. The method of claim 1, further comprising determining that the first container image is open container initiative (OCI) compliant and that the first container management tool is associated with a different set of file repository locations than the second container management tool.

6. The method of claim 1, further comprising:
  scanning the first computing device to determine a set of container management tools being executed by the first computing device; and
  translating the first binary representation into a respective modified binary representation for each container management tool of the set of container management tools.

7. The method of claim 6, further comprising:
  determining a set of file locations associated with each container management tool of the set of container management tools; and
  generating instructions effective to cause the first computing device to store each of the respective modified binary representations in a corresponding one of the file locations associated with the respective container management tool.

8. A system comprising:
  at least one processor; and
  non-transitory computer-readable memory storing instructions that, when executed by the at least one processor, are effective to:
    perform, by a first computing device, a first pull operation for a first container image, wherein the first container image was generated using a first container management tool that is incompatible with the first computing device;
    send, by a daemon executing on the first computing device, first data indicating the first container image to at least one remote computing device configured to read a first binary representation of the first container image, the first binary representation being associated with the first container management tool;
    receive, by the daemon and from the at least one remote computing device, a second binary representation of the first container image that corresponds to a second container management tool associated with the first computing device, the first binary representation being translated into the second binary representation;

receive, by the daemon and from the at least one remote computing device, second data including instructions effective to cause the first computing device to store the second binary representation in a file location associated with the second container management tool; and execute, by the first computing device, a first container by the second container management tool using the second binary representation.

9. The system of claim 8, wherein the at least one remote computing device is configured to:

generate the second binary representation;

send the second binary representation of the first container image to the first computing device; and send the instructions to the first computing device to store a first layer of the first container image in a first location in a local file system of the first computing device, wherein the first location is associated with the second container management tool.

10. The system of claim 8, the non-transitory computer-readable memory storing further instructions that, when executed by the at least one processor, are further effective to:

determine a first number of layers of the first container image; and store the first number of layers of the first container image at a first location in a file repository that is associated with the first container management tool, wherein the second binary representation comprises instructions to store pointer data at a second location in the file repository that is associated with the second container management tool.

11. The system of claim 10, wherein the pointer data points to the first location in the file repository.

12. The system of claim 8, the non-transitory computer-readable memory storing further instructions that, when executed by the at least one processor, are further effective to:

determine that the first container image is open container initiative (OCI) compliant and that the first container management tool is associated with a different set of file repository locations than the second container management tool.

13. The system of claim 8, the non-transitory computer-readable memory storing further instructions that, when executed by the at least one processor, are further effective to:

scan the first computing device to determine a set of container management tools being executed by the first computing device; and translate the first binary representation into a respective modified binary representation for each container management tool of the set of container management tools.

14. The system of claim 13, the non-transitory computer-readable memory storing further instructions that, when executed by the at least one processor, are further effective to:

determine a set of file locations associated with each container management tool of the set of container management tools; and generate instructions effective to cause the first computing device to store each of the respective modified binary representations in a corresponding one of the file locations associated with the respective container management tool.

15. A non-transitory computer-readable memory storing instructions that, when executed by at least one processor, are effective to perform operations comprising:

performing, by a first computing device, a first pull operation for a first container image, wherein the first container image was generated using a first container management tool that is incompatible with the first computing device;

sending, by a daemon executing on the first computing device, first data indicating the first container image to at least one remote computing device configured to read a first binary representation of the first container image, the first binary representation being associated with the first container management tool;

receiving, by the daemon and from the at least one remote computing device, a second binary representation of the first container image that corresponds to a second container management tool associated with the first computing device, the first binary representation being translated into the second binary representation;

receiving, by the daemon and from the at least one remote computing device, second data including instructions effective to cause the first computing device to store the second binary representation in a corresponding file location associated with the second container management tool; and executing, by the first computing device, a first container by the second container management tool using the second binary representation.

16. The non-transitory computer-readable memory of claim 15, storing further instructions that, when executed by the at least one processor, are effective to perform operations further comprising:

determining that the first container image is open container initiative (OCI) compliant and that the first container management tool is associated with a different set of file repository locations than the second container management tool.

* * * * *